J. JONES.
WATER CYCLE.
APPLICATION FILED SEPT. 29, 1914.
1,138,571.
Patented May 4, 1915.
2 SHEETS—SHEET 2.
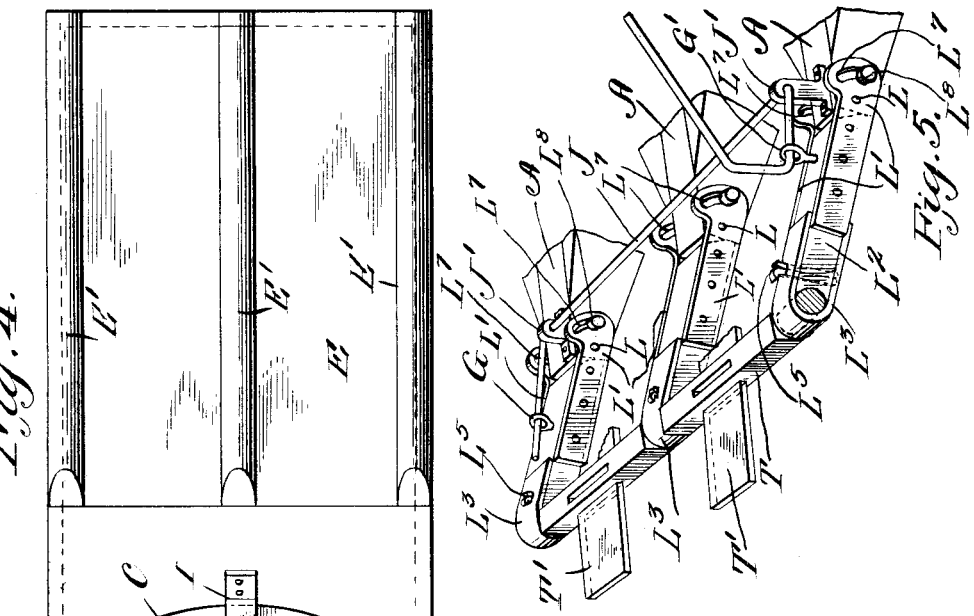
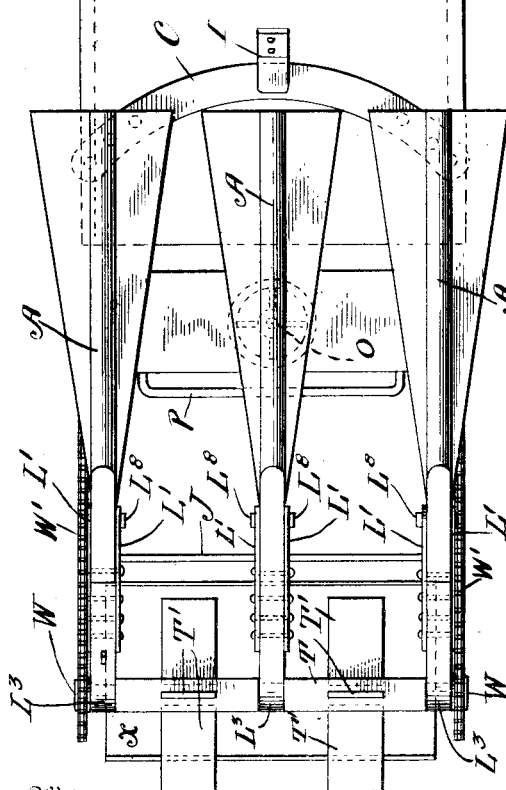
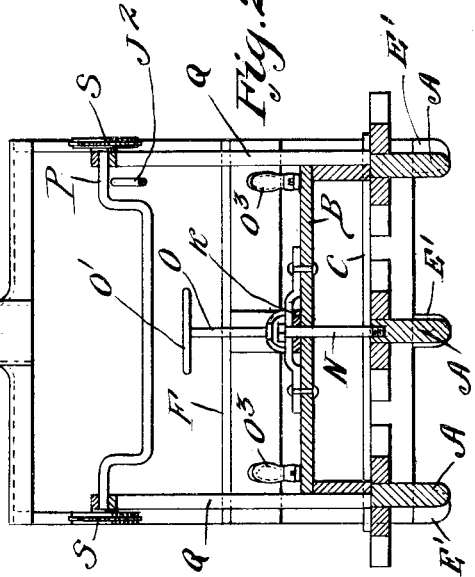
Inventor
John Jones,

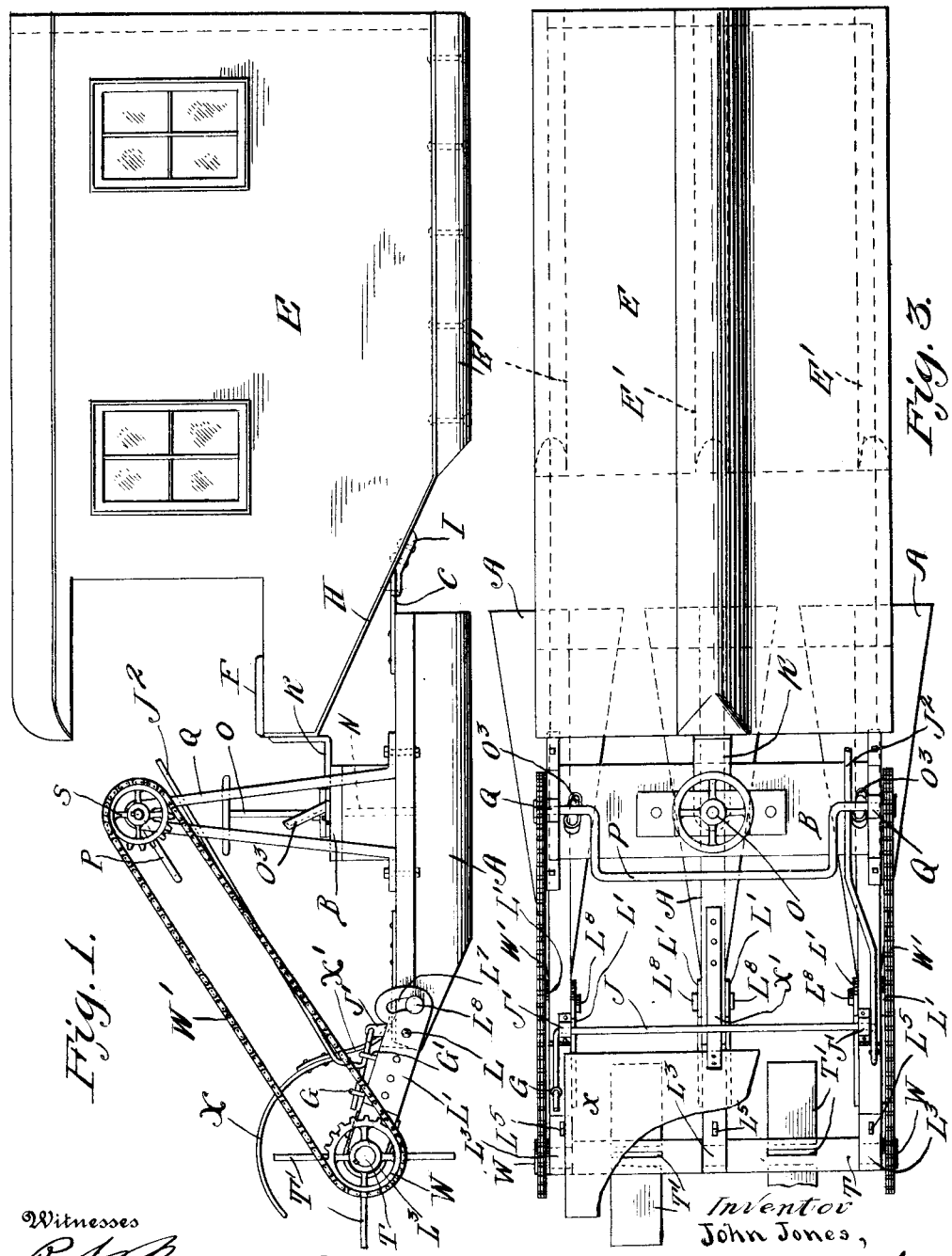

UNITED STATES PATENT OFFICE.

JOHN JONES, OF BOKHOMA, OKLAHOMA.

WATER-CYCLE.

1,138,571.      Specification of Letters Patent.      Patented May 4, 1915.

Application filed September 29, 1914. Serial No. 864,112.

*To all whom it may concern:*

Be it known that I, JOHN JONES, a citizen of the United States, residing at Bokhoma, in the county of McCurtain and State of Oklahoma, have invented certain new and useful Improvements in Water-Cycles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in water cycles and comprises a simple and efficient apparatus of this nature, having various details of construction, combinations and arrangements of parts which will be hereinafter fully described, shown in the accompanying drawings and then specifically defined in the appended claims.

My invention is illustrated in the accompanying drawings, in which:

Figure 1 is a side elevation of my improved water cycle. Fig. 2 is a front view. Fig. 3 is a top plan view, and Fig. 4 is a bottom plan view of the apparatus. Fig. 5 is a perspective view of the propelling mechanism.

Reference now being had to the details of the drawings by letter, A, A designate a series of buoyant runners, made preferably of cork or other buoyant material, and which are fastened together by means of the plate B having a curved segment C secured to the upper surfaces of the outer of said buoyant runners. E designates a car which has a seat F and the forward end of said car is cut away as at H and has buoyant and tapering guide strips E' projecting from the bottom thereof and serving to prevent the car from drifting or moving sidewise. I designates a bracket arm fastened to said inclined portion and adapted to bear against the under surface of said curved segment C and serving as a means for preventing the runners from tilting independent of a car and still allowing the runners to turn for the purpose of steering the apparatus.

An angled plate K is fastened at one end to the forward end of the car and its other end is pivotally connected to the king bolt N secured to the plate B. A steering shaft O is fixed to the plate B and has a wheel O' at its upper end forming a convenient means for turning the runners which are fixed together. Foot steering plates, designated by letter $O^3$, are fastened one near each of said standards Q and serve as means whereby the operator pushing upon one or the other may assist in steering the craft. Standards Q, with their lower ends angled, are fastened to and rise from the runners and a crank shaft P is journaled in said standards to which the sprocket wheels S are fixed.

Pivotally mounted upon the pins L carried near the forward ends of the runners are the slotted plates L', the shank portions of which are fastened upon the opposite sides of the bars $L^2$ and which latter have the straps $L^3$ bent over the ends of the bars and held by means of keys $L^5$ passing through registering slots in the straps and slots in the bars and coöperate with concaved ends of the bars to form bearings for a propeller shaft T, having blades T' fixed thereto. The rear ends of the plates L' have curved slots $L^7$ formed therein, and pins $L^8$ projecting from the opposite sides of the runners pass through said curved slots and serve to guide the plates L' as the latter are tilted upon their pivots. Sprocket wheels W are fixed to the shaft T and chains W' pass about said sprocket wheels and the sprocket wheels S before referred to, forming means whereby, as the crank shaft is rotated, a rotary movement may be imparted to the shaft carrying the propeller blades.

An angled shaft, designated by letter J, is journaled in suitable bearings J' projecting from the upper surface of the outer of the runners and one angled end of the shaft J engages an eye G upon one of the bars $L^2$, while an angled portion of the shaft engages another eye G' upon the bar at the opposite side and the bar is bent at an inclination to form a handle $J^2$ in convenient reach of the operator positioned near the steering wheel. A fender X is mounted upon a bar X' and extends over the propeller blades.

The operation of my invention will be readily understood and is as follows: The propeller shaft is rotated by the rotation of the crank shaft or, if preferred, a motor of any construction might be connected to the propeller shaft for rotating the same. The series of bars $L^2$ carrying the propeller shaft may be raised and lowered by the rocking of the shaft J to cause the propeller blades to dip at different depths in the water, the plates L′ being adapted to tilt upon the pins L. The various buoyant runners being fastened together are turned in one direction or the other through the medium of the steering wheel to guide the craft, while the curved segment secured to the rear ends of the runners, engaging the bracket arm on the under inclined portion of the car serves to prevent the runners from tilting up and down independent of the car, while the runners are allowed free lateral motion to guide the craft.

What I claim to be new is:

1. A water cycle comprising a car having the forward end thereof undercut and provided with horizontally disposed guide strips projecting from the bottom thereof, a bracket arm fixed to the undercut portion of the car, buoyant runners, a crosspiece connecting the same, an angled bar fastened to the forward end of the car and to which said crosspiece is pivotally connected, a curved plate fastened to the runners and guided between the wall of the undercut portion of the car and said bracket member, and means for propelling the apparatus.

2. A water cycle comprising a car having the forward end thereof undercut and provided with horizontally disposed guide strips projecting from the bottom thereof, a bracket arm fixed to the undercut portion of the car, buoyant runners, a crosspiece connecting the same, an angled bar fastened to the forward end of the car and to which said crosspiece is pivotally connected, a curved plate fastened to the runners and guided between the wall of the undercut portion of the car and said bracket member, adjustably mounted slotted plates fastened to the forward ends of the runners, propellers mounted upon said slotted plates, and means for driving the propellers.

In testimony whereof I hereunto affix my signature in presence of two witnesses.

JOHN $\overset{\text{his}}{\underset{\text{mark}}{\times}}$ JONES.

Witnesses:
J. H. GASSAWAY,
R. P. KIRBY.

Copies of this patent may be obtained for five cents each, by addressing the "Commissioner of Patents, Washington, D. C."